United States Patent [19]

Bosco et al.

[11] Patent Number: 4,747,555
[45] Date of Patent: May 31, 1988

[54] LOCKING ARRANGEMENT FOR THE HUB OF A TAPE SPOOL ON A ROTATING SHAFT

[75] Inventors: Angelo Bosco, San Donato Milanese; Edgardo Magnaghi, Peschiera Borromeo, both of Italy

[73] Assignee: Robotecnica S.r.l., Sesto San Giovanni, Italy

[21] Appl. No.: 918,299

[22] Filed: Oct. 14, 1986

[30] Foreign Application Priority Data

Oct. 11, 1985 [IT] Italy .................. 22448 A/85

[51] Int. Cl.⁴ .................................. B65H 18/10
[52] U.S. Cl. .......................... 242/68.2; 242/68.3
[58] Field of Search .............. 242/68.2, 68.3, 72.1

[56] References Cited

U.S. PATENT DOCUMENTS

| | | | |
|---|---|---|---|
| 2,882,078 | 4/1959 | MacDonald | 242/68.3 X |
| 3,140,061 | 7/1964 | Benson . | |
| 3,278,132 | 10/1966 | Camras et al. | 242/68.3 |
| 3,379,388 | 4/1968 | Cruczelak | 242/68.3 |
| 3,731,885 | 5/1973 | Siebert | 242/68.3 |
| 3,863,856 | 2/1975 | Conlon | 242/68.3 |
| 4,432,506 | 2/1984 | Bingaman | 242/68.3 |
| 4,615,494 | 10/1986 | Focke et al. | 242/68.3 |

FOREIGN PATENT DOCUMENTS

| | | |
|---|---|---|
| 0026964 | 4/1981 | European Pat. Off. . |
| 2064362 | 7/1972 | Fed. Rep. of Germany . |
| 2400618 | 10/1976 | Fed. Rep. of Germany . |
| 2829824 | 9/1979 | Fed. Rep. of Germany . |

*Primary Examiner*—John Petrakes
*Assistant Examiner*—Joseph J. Hail, III
*Attorney, Agent, or Firm*—Barnes & Thornburg

[57] ABSTRACT

A locking arrangement of a tape spool hub with respect to a rotating shaft is obtained by outwardly extendable levers that press the tape spool hub to a rotary drive such that the spool is centered in a driving position on a support base on the rotating shaft and is also prevented from accidentally falling off the support base.

11 Claims, 2 Drawing Sheets

LOCKING ARRANGEMENT FOR THE HUB OF A TAPE SPOOL ON A ROTATING SHAFT

BACKGROUND AND SUMMARY OF THE INVENTION

This invention relates to a locking arrangement of a tape spool hub on a rotating shaft.

In the case of machines that use large spools of a magnetic tape wound onto a central hub, there exists the necessity that the spool itself be mounted in such a way that it seats firmly on the machine. This is especially necessary in the case of high rotating speeds and repeated accelerations and braking such as are found in continuous feeding automatic machines for the loading of magnetic tape onto a cassette.

One known locking arrangement uses a number of elastic balls that are brought in contact with the spool hub in such a way that the spool is held at least partially by the balls complementary positions. However, in this case, the spool or better the spool hub, when subjected to significant stress, has the tendency to jump out of the locking arrangement, causing a stop to production and possibly damage to the tape material on the spool.

In the case of other locking arrangements, ring elements made of plastic, or a type of rubber that is partially plastic are used. These ring elements can exercise a slight pressure on the hub resulting in locking, but provide low reliability and the probability of the hub jumping out, or falling off of the spool, and do not provide a high degree of reliability for a secured driving connection under continuous stress caused by various high speeds, quick starts and stops and other normal operating conditions.

An objective of the invention is to provide a reliable locking arrangement without the use of a mechanism having sharp edges, levers or similar means that are extremely dangerous at high speeds.

According to the invention, this objective is achieved by a locking arrangement of a tape spool hub on a rotating shaft which has a central body with a support base or support element that the hub and the shaft have in common. A mechanism for locking said hub with respect to the said support base comprises three operating elements made of plastic, that jointly project at the exterior of the central parts of three pivoted levers that rotate with the base or support element and which can be moved into frictional engagement with the spool by means of external control means operating on one end of the levers. Pivot pin arrangements for the levers are disposed under said support base or support element. Pivoting of the levers in response to the external control causes the three operating elements to be in a sloped position when they come in contact with the interior surface of said hub to not only frictionally drive the hub, but to also provide a force to retain the hub against the base or support element to avoid a jumping out or falling off of the hub.

These and other objects, features, and advantages of the present invention will become more apparent from the following description when taken with the accompanying drawings which show, for purposes of illustration only, an embodiment in accordance with the present invention.

Figure 1:
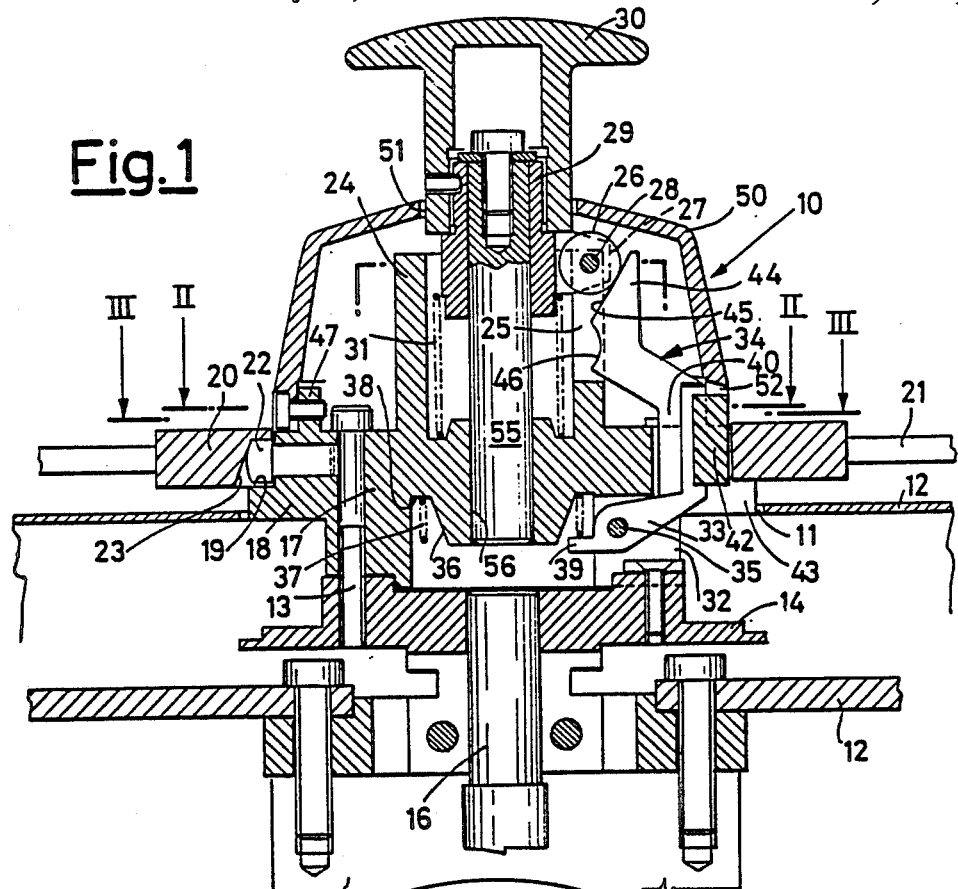
FIG. 1 is a side sectional view of a set-up locking arrangement constructed according to a preferred embodiment of the present invention, taken along section line I—I of FIG. 2.
Figure 2:
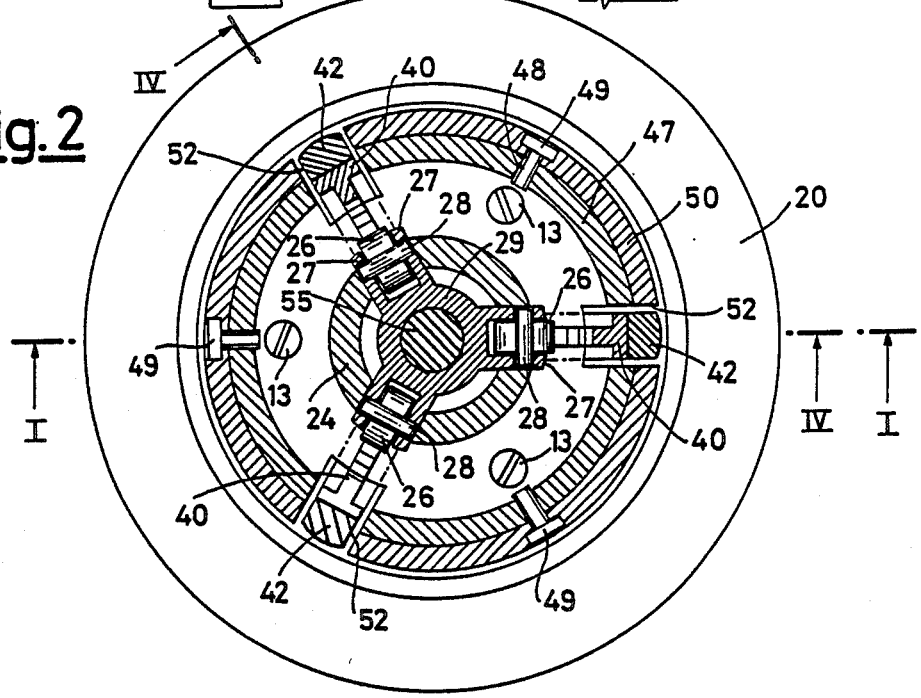
FIG. 2 is a plan sectional view taken along section line II—II of FIG. 1.
Figure 3:
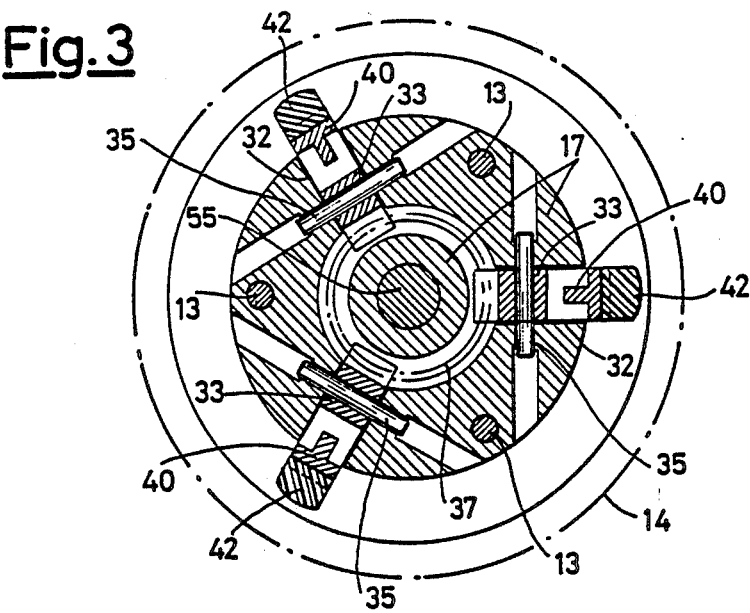
FIG. 3 is a plan sectional view taken along section line III—III of FIG. 1.

Referring now to the drawings wherein like reference numerals are used to designate like parts and more particularly to FIG. 1, a locking arrangement mechanism 10 for a magnetic tape spool is rotatably located in an opening 11 of housing 12 and rigidly connected thereto by means of screws 13 and a flange 14 that is rotatably interlocked in a conventional manner with a motor shaft 16, held on an exterior part of the housing 12.

The screws 13 connect the flange 14 firmly with the rotating shaft that leads to a central part 17 of the body 18 of the locking mechanism which extends downwardly into the housing 12 and from which a ring-shaped part extends outwardly in radial direction to define a base 19 having a certain profile to carry the support element for the hub 20 of a magnetic tape spool 21.

Three spikes 22 project radially from this profiled base 19, are arranged uniformly about the base 19 at 120° intervals at points 23 on the hub 20 and rotate together with the locking arrangement mechanism 10.

A cylincrical hollow part 24 of the body 18 extends upward in a circular way to form the central part of the body 18. Said cylindrical hollow part 24, at its lateral circular side surface, has three virtually extending guide slots 25, each able to receive a respective roller 26 journalled to pairs of lugs 27 by bolts 28. The rollers and lugs are radially oriented and symetrically placed at 120° intervals to the outside from a central body 29 of a button or exterior control part 30. The body 29 moves vertically on a cylindrical shaft 55 mounted in a hole 56 of the central part 17 of the body along its axis of rotation and the shaft 55 functions as a centering element for the vertical movement of the central body 29 during the actuation of the button 30.

The body 29 moves vertically along the central axis as guided by the shaft 55 and is prevented from rotating relative to the inside of the cylindrical part 24. A coil spring 31 is inserted between the central body inwardly of the hollow part 24 to normal oppose downward motion of the body 29.

Three passageways 32 are provided in a lower portion of the central part 17 of the body 18 to receive lower ends 33 of generally C-profiled shape levers 34. The open side of the C-shape faces the axis of the central body. These generally C-profiled shaped levers are rotatively mounted to the control part 17 of the body by means of pins 35 in the passageways 32. At the bottom side of the central part 17, of the body 18 is a reduced portion 36. Another coil spring 37 is disposed between a circular indentation 38 at the top of this said reduced portion 36 and radial extending branch ends 39 of said three levers 34. In the inoperative locking position, the radial extending branch ends are oriented horizontally and at right angles to the axis of the shaft 55 by the springs 27. Operating elements 42, made mainly of prismatic plastic are disposed at control parts 40 of the levers 34 at respective points 41 (see FIG. 4). Said central parts 40 as well as said operating elements 42 are movable to pass through laterally opening slots 43 of the ring-shaped part 19 of the locking body 18.

The levers 34, at their upper part 44, have a sloped surface 45 and arched-in areas 46 that cooperate with the rollers 28 on the body 29 and which are moved downward by virture of movement of body 29 as a consequence of a depression of button 30.

Ring-shaped arched elements 47 extend over the ring-shaped part of the body 18. Said elements 47 have holes 48 into which locking screws 49 are provided for securing a bell-shaped hollow cover 50 to the body 18. The hollow cover 50 has a hole 51 on its top and in the center, loosely surrounding the lower portion of the button 30. The cover 50 encases the body of the locking arrangement.

The bell-shaped hollow body 50 has openings 52 that are located laterally and in correspondence with the central parts 40 of the levers 34 to allow for outward passage of the operating elements 42 toward the hub 20 of the spool.

The use of three levers 34 spaced at angles of 120° and rollers 26 provide for stability and smooth engagement of the locking device.

As shown in FIG. 1, the hub 20 of a magnetic tape spool 21 is mounted at the base 19 of the locking mechanism 10 in such a way that points 23 of the hub 20 are in correspondence with the respective pins 22.

Figure 4:
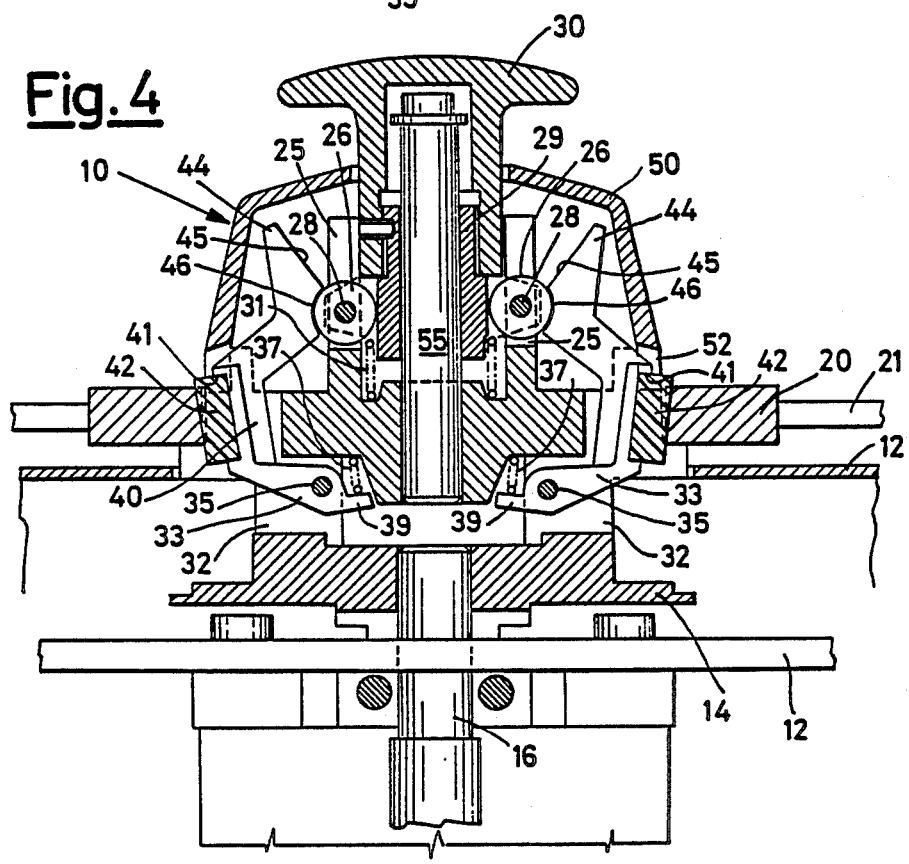
FIG. 4 is a side sectional view similar to the one in FIG. 1, but in a different operating position and taken along section line IV—IV of FIG. 2.

When the push button 30 is actuated, it moves downward, as shown in FIG. 4, carring body 29 and rollers 28. The rollers 28 move on the surfaces 45 and press the upper portions 44 of the levers 34 apart. The rollers 28 come to a rest in a stable lowered position wherein they engage arched-in areas 46 which retain the rollers 28 and button in its downward engaged position. The pressing apart of the upper portions 44 of the levers 34 around causes the levers to pivot around the pins 35, which causes the central part of the levers to move outwardly with the operating elements 42 against the interior wall of the spool hub 20. As shown in FIG. 4, the surfaces of the operating elements 42 are sloped with respect to the interior surface of the hub 20 in such a way that the elements not only frictional secure the surface 20 to the hub, but stress the hub downardly thus preventing the hub from moving upwardly. Thus the hub is prevented from falling from its drive.

The pressure of the operating elements 42 also ensures the centering and the self-adjustment of the spool with respect to the locking arrangement in such a way that correct rotation of the reeling-on and reeling-off of the tape from the hub is obtained.

A locking arrangement according to the present invention can advantageously be used in automatic machines for the initial loading of magnetic tape onto a cassette, or for any cassette drives such as found in the tape recorders, VCR's or machines used to load tape onto cassettes. Said tape may be spooled on spools of relatively large dimensions that amount to many times the length of the tape that is required for the filling of a cassette. The locking arrangement can be used for any type of tape drives such as are normal in computer installation.

While we have shown and described only one embodiment in accordance with the present invention, it is understood that the same is not limited therto but is susceptible to numerous changes and modifications as known to one having ordinary skill in the art, and we therefore do not wish to be limited to the details shown and described herein, but intend to cover all such modifications as are encompassed by the scope of the appended claims.

What is claimed is:

1. A locking arrangement for a tape spool hub on a rotating shaft having a central body with a common support means for the tape spool hub and the rotating shaft, means for locking said tape spool hub with respect to said support base, wherein there are at least three engaging elements that each project from a central portion of separate level means, each of said separate lever means being pivotally connected at one end thereof with the central body, control means acting on another end of the lever means to cause the lever means to pivot about said pivoted connections to an engaged position, said pivoted connections being located under said support means and said lever means causing said at least three engaging elements to be in a sloped position with respect to an interior surface of said tape spool hub so as to engage the internal surface in said sloped position upon pivoting of the lever means in response to the control means, said lever means having a sloped surface and an arched-in area at its other end which cooperates with said control means to cause the levers to be pivoted and to be retained in the pivoted engaged position, and wherein said control means moves roller means upon actuation to engage said slope surface of the lever means to cause said lever means to be pivoted and the roller means being subsequently held in said arched-in area to retain the lever means as pivoted.

2. A locking arrangement according to claim 1, wherein said roller means for the pivoting of the lever means radially projects from and are rotatable with said control means, and at least one biasing means is located between said central body and the control means for opposing actuation of said control means.

3. A locking arrangement according to claim 2, wherein said lever means each have essentially a C-profile with an open side of the C-profile facing said central body and with the engagement means being located outwardly of the C-profile and between the pivot connection and the other end.

4. A locking arrangement according to claim 3, wherein said central body has a cylindrical shaft on its upper side on which said control means moves in an axially guided way.

5. A locking arrangement according to claim 2, wherein said central body has a cylindrical shaft on its upper side on which said control means moves in an axially guided way.

6. A locking arrangement according to claim 1, wherein said lever means each have essentially a C-profile with an open side of the C-profile facing said central body and with the engagement means being located outwardly of the C-profile and between the pivot connection and the other end.

7. A locking arrangement according to claim 6, wherein said central body has a cylindrical shaft on its upper side on which said control means moves in an axially guided way.

8. A locking arrangement according to claim 1, wherein said central body has a cylindrical shaft on its upper side on which said control means moves in an axially guided way.

9. A locking arrangement for a tape spool hub on a rotating shaft having a central body with a common support means for the tape spool hub and the rotating shaft, means for locking said tape spool hub with respect to said support base, wherein there are at least three engaging elements that each project from a central portion of separate lever means, each of said separate lever means being pivotally connected at one end thereof with the central body, control means acting on another end of the lever means to cause the lever means to pivot about said pivoted connections to an engaged position, said pivoted connections being located under said support means and said lever means causing said at least three engaging elements to be in a sloped position with respect to an interior surface of said tape spool hub so as to engage the internal surface in said sloped position upon pivoting of the lever means in response to the control means, and wherein a bell-shaped hollow body is provided as a covering for the central body, the bell-shaped hollow body having an opening at one end thereof for the control means to pass therethrough and lateral openings in another portion thereof that are in registry with and permit the engaging elements to pass therethrough and wherein the interior surface of the tape hub spool surrounds the bell-shaped hollow body.

10. A locking arrangement for a tape spool hub on a rotating shaft having a central body with a common support means for the tape spool hub and the rotating shaft, means for locking said tape spool hub with respect to said support base, wherein there are at least three engaging elements that each project from a central portion of separate level means, each of said separate lever means being pivotally connected at one end thereof with the central body, control means acting on another end of the lever means to cause the lever means to pivot about said pivoted connections to an engaged position, said pivoted connections being located under said support means and said lever means causing said at least three engaging elements to be in a sloped position with respect to an interior surface of said tape spool hub so as to engage the internal surface in said sloped position upon pivoting of the lever means in response to the control means, wherein said lever means each have essentially a C-profile with an open side of the C-profile facing said central body and with the engagement means being located outwardly of the C-profile and between the pivot connection and the other end, and wherein a bell-shaped hollow body is provided as a covering for the central body, the bell-shaped hollow body having an opening at one end thereof for the control means to pass therethrough and lateral openings in another portion thereof that are in registry with and permit the engaging elements to pass therethrough and wherein the interior surface of the tape hub spool surrounds the bell-shaped hollow body.

11. A locking arrangement for a tape spool hub on a rotating shaft having a central body with a common support means for the tape spool hub and the rotating shaft, means for locking said tape spool hub with respect to said support base, wherein there are at least three engaging elements that each project from a central portion of separate lever means, each of said separate lever means being pivotally connected at one end thereof with the central body, control means acting on another end of the lever means to cause the lever means to pivot about said pivoted connections to an engaged position, said pivoted connections being located under said support means and said lever means causing said at least three engaging elements to be in a sloped position with respect to an interior surface of said tape spool hub so as to engage the internal surface in said sloped position upon pivoting of the lever means in response to the control means, wherein said central body has a cylindrical shaft on its upper side on which said control means moves in an axially guided way, and wherein a bell-shaped hollow body is provided as a covering for the central body, the bell-shaped hollow body having an opening at one end thereof for the control means to pass therethrough and lateral openings in another portion thereof that are in registry with and permit the engaging elements to pass therethrough and wherein the interior surface of the tape hub spool surrounds the bell-shaped hollow body.

* * * * *